US006774896B2

(12) United States Patent
Oka

(10) Patent No.: US 6,774,896 B2
(45) Date of Patent: *Aug. 10, 2004

(54) METHOD AND APPARATUS FOR GENERATING IMAGE DATA BY MODULATING TEXTURE DATA WITH COLOR DATA AND BRIGHTNESS DATA

(75) Inventor: Masaaki Oka, Kanagawa (JP)

(73) Assignee: Sony Computer Entertainment, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/082,671

(22) Filed: May 21, 1998

(65) Prior Publication Data

US 2001/0045955 A1 Nov. 29, 2001

(30) Foreign Application Priority Data

May 26, 1997 (JP) ........................................... P9-135622

(51) Int. Cl.[7] .............................................. G06T 15/00
(52) U.S. Cl. ....................... 345/426; 345/419; 345/582; 345/589; 345/592
(58) Field of Search ......................... 345/418, 419–421, 345/426, 582–593, 606–607

(56) References Cited

U.S. PATENT DOCUMENTS

| 5,063,375 A | * | 11/1991 | Lien et al. ................... 345/616 |
| 5,253,339 A | * | 10/1993 | Wells et al. ................. 345/426 |
| 5,421,589 A | * | 6/1995 | Monroe ....................... 273/437 |
| 5,461,712 A | * | 10/1995 | Chelstowski et al. ........ 395/164 |
| 5,467,438 A | * | 11/1995 | Nishio et al. ................ 345/600 |
| 5,561,746 A | * | 10/1996 | Murata et al. ............... 395/119 |
| 5,659,671 A | * | 8/1997 | Tannenbaum et al. ....... 345/426 |
| 5,673,374 A | * | 9/1997 | Sakaibara et al. ........... 345/426 |
| 5,710,876 A | * | 1/1998 | Peercy et al. ................ 345/426 |
| 5,739,820 A | * | 4/1998 | Lyon ........................... 345/426 |
| 5,740,343 A | * | 4/1998 | Tarolli et al. ................ 345/501 |
| 5,808,619 A | * | 9/1998 | Choi et al. ................... 345/426 |
| 5,870,102 A | * | 2/1999 | Tarolli et al. ................ 345/430 |
| 5,900,881 A | * | 5/1999 | Ikedo .......................... 345/426 |
| 6,031,542 A | * | 2/2000 | Wittig ......................... 345/426 |
| 6,054,993 A | * | 4/2000 | Devic et al. ................. 345/426 |
| 6,064,395 A | * | 5/2000 | Miura ......................... 345/430 |
| 6,100,895 A | * | 8/2000 | Miura et al. ................. 345/426 |

FOREIGN PATENT DOCUMENTS

JP          07-152925          6/1995

* cited by examiner

*Primary Examiner*—Matthew Luu
*Assistant Examiner*—Daniel J Chung
(74) *Attorney, Agent, or Firm*—Fulwider Patton Lee & Utecht, LLP

(57) ABSTRACT

A multiplication circuit (33a) of a modulation circuit (33) is provided to multiply color components from a texture mapping circuit (31) using a texture information and triangle vertex coordinates by color components from an interpolation circuit (32) using triangle vertex color information obtained using a perfect scattered reflection model and the triangle vertex coordinates. On the other hand, brightness components of three vertex color information from the interpolation circuit (32) is added to an output of the multiplication circuit (33) in a first adder circuit (33b) to generate color components of an output image. Thereby, an image having a three-dimensional vision can be generated without any increased scale of hardware and decreased speed of processing.

11 Claims, 8 Drawing Sheets

METHOD AND APPARATUS FOR GENERATING IMAGE DATA BY MODULATING TEXTURE DATA WITH COLOR DATA AND BRIGHTNESS DATA

BACKGROUND OF THE INVENTION

1. Field of the Invention

The present invention relates to a method for generating an image for display on a graphic computer, entertainment device, video device, etc., and more particularly to a method and apparatus for generating, by shading, an image having a stereoscopic or three-dimensional vision.

2. Description of Related Art

For generating a game displayed on a graphic computer, computer-game device, video device or the like, a method called "texture mapping" is known by which an image is generated by deforming a texture and pasting it on a three-dimensionally defined object.

FIG. 1 shows the texture mapping method. As shown, a rectangular texture 101 is pasted on a spherical region defined as a three-dimensional object to generate an image of a sphere 102.

Although the object image thus generated is defined three-dimensionally, its stereoscopic vision is poor since the image is only a monotonous figure displayed two-dimensionally. For easier recognition of the shape and spatial position of a object when displayed, it has been proposed to shade an object by irradiating to the object a light from a virtual source, thereby allowing the object to have a three-dimensional vision.

For such a shading, a variety of models different in type of virtual light source and reflection at object surface from one another has been proposed. Typical ones of the shading models are a perfect scattered reflection model and a specular reflection model which will be described herebelow.

FIG. 2 shows a perfect scattered reflection model for shading a sphere 102.

It is assumed in the perfect scattered reflection model that a virtual light source emits parallel rays L having only directions and colors and the surface of an object is rough and has only colors, not any certain reflecting direction depending upon the position of the light source.

Assume here that the parallel rays L have colors Lr, Lg and Lb and directions Lx, Ly and Lz and that a point P on the surface of an object have colors Rt, Gt and Bt (texture information) and normals N to the point P are Nx, Ny and Nz. Then, colors of reflected rays of light from the point P on the object surface are given by the following equations (1). Note that a shift and clamp for a calculation using a fixed point are omitted.

$$R=Rt*Lr*(Lx*Nx+Ly*Ny+Lz*Nz)$$
$$G=Gt*Lg*(Lx*Nx+Ly*Ny+Lz*Nz) \quad (1)$$
$$B=Bt*Lb*(Lx*Nx+Ly*Ny+Lz*Nz)$$

Namely, in the perfect scattered reflection model, the reflected rays of light from a point on the surface of an object depend upon the direction and colors of rays from a light source and normals to and colors of a point on the object surface, independently of the position of a viewer.

Next, the specular reflection model will be described below.

FIG. 3 shows a specular reflection model for shading the sphere 102.

It is assumed in the specular reflection model that a virtual light source is a point source H having a position and colors and rays of light are diverged in a same manner in all directions from the source H. Also, the surface of an object is smooth like a mirror and reflected rays of light travel in directions symmetrical with respect to a normal N to a point P on the object.

Assume here that a straight line PS connecting the view point S of a viewer and the point P on the object forms an angle θ with reflected rays of light OR. Then, colors of reflected rays of light from the point P on the object surface are given by the following equations (2).

$$R=Hr*(\cos \theta)^n$$
$$G=Hg*(\cos \theta)^n \quad (2)$$
$$B=Hb*(\cos \theta)^n$$

where n is a value depending upon a material of the object. Note that the larger the value n, the smoother the object surface is and the larger the light reflecting area of the object is.

Namely, in the specular reflection model, the reflection at the object surface varies depending upon a viewer's position and is independent of colors (texture information) of a point on the object.

A combination of the aforementioned perfect scattered reflection model and specular reflection model will be described below.

FIG. 4 shows a combination of the aforementioned two types of reflection models to shade a sphere 102 with rays of light from parallel rays L and point source H.

The combination of the two types of reflection model provides an object shading more approximate to a real shading of an actual object than use of one model of reflection model, and a stereoscopic or three-dimensional vision of the object. A calculation of reflected rays of light for shading of an object using the combination of two types of reflection model is done with a following set of expressions:

$$R=Rt*Lr*(Lx*Nx+Ly*Ny+Lz*Nz)+Hr*(\cos \theta)^n$$
$$G=Gt*Lg*(Lx*Nx+Ly*Ny+Lz*Nz)+Hg*(\cos \theta)^n \quad (3)$$
$$B=Bt*Lb*(Lx*Nx+Ly*Ny+Lz*Nz)+Hb*(\cos \theta)^n$$

The first term of each relation in (3) indicates a reflection by the perfect scattered reflection model, and the second term indicates a reflection by the specular reflection model.

However, a vast volume of calculation will be required for obtaining reflected rays of light for all points on an object by using the set of expressions (3). Therefore, it is impossible as a matter of fact to effect the calculation at a high speed. For solution of this problem, it has been proposed to divide the surface of an object into a plurality of small polygonal areas and effect the above-mentioned calculation with only their vertexes of the polygonal areas, thereby reducing the volume of calculation.

FIG. 5 shows how to divide a spherical surface into small triangles for the above-mentioned calculation.

As seen, colors of all pixels included in a triangle thus defined through the division of the object surface are calculated with a linear interpolation using colors calculated with three vertexes. This method is called "glow shading".

FIG. 6 shows how to calculate all colors of pixels included in each triangle on the object surface. As shown, a triangle 3a of which a color (texture information) of a point on the surface is given, and another triangle 3b of which a color change information is given, are used in a linear interpolation to provide an triangle 3c of which colors of all pixels are calculated.

Generally, such an interpolation is done by a graphic processing unit (GPU) (will be referred to as "graphic processor" hereafter), and the results of the interpolative calculation are written into an image memory.

The graphic processor is a hardware which uses three vertexes of a triangle, color information of the three vertexes and texture information to effect a linear interpolation of the color information, interpolation of the texture, and a multiplication of them.

Each of the color information and texture information is generally composed of four color components R, G, B and A. The color components R, G and B are color information indicative of red, green and blue, respectively. The component A is an information used for a translucent plotting and generally called "alpha channel". Generally, the graphic processor comprises a color information interpolation circuit and a texture mapping circuit provided for each of the four color components R, G, B and A.

FIG. 7 shows the configuration of a conventional graphic processor.

As shown, the graphic processor comprises a texture mapping circuit 11, and a color information interpolation circuit 12. The texture mapping circuit 11 is provided to use supplied texture information Rt, Gt, Bt and At and coordinates of three vertexes of a triangle to effect a texture mapping. The color information interpolation circuit 12 uses the three-vertex color information of the triangle and the coordinates of the three vertexes to effect an interpolation of color information.

An output from the texture mapping circuit 11 and a one from the color information interpolation circuit 12 are supplied to a modulation circuit 13 and multiplied together in a multiplication circuit 13a. The result of this multiplication is an output image (Ro, Go, Bo, Ao).

It should be noted that the modulation circuit 13 makes an modulation of supplied information by addition, not by multiplication as the case may be.

The glow shading shown in FIG. 6 is one of the functions of the conventional graphic processor. For the glow shading, the conventional graphic processor multiplies a texture information by a color change information after subjected to the linear interpolation.

To modulate a texture using two kinds of color change information provided through the aforementioned perfect scattered reflection model and specular reflection model, however, the graphic processor has to include two glow shading circuits.

FIG. 8 shows how to module a texture using two kinds of color change information.

A texture information 4a from a texture mapping circuit is modulated with a first color change information 4b from a first color interpolation circuit 22a to provide a modulated texture 4c. The modulated texture 4c is further modulated with a second color change information 4d from a second color interpolation circuit 22b to provide a modulated texture 4e. To effect a calculation using the above-mentioned perfect scattered reflection model and a calculation using the specular reflection, a modulation using the first color change information is done through multiplication while a modulation using the second color change information is done through addition.

Thus, the circuit for interpolation of the color change information has to be doubled for modulation of a texture using two kinds of color change information. Also, the bus band should have an excessive width to supply the graphic processor with two kinds of color change information including one having been calculated using the specular reflection model and the other having been calculated using the specular reflection model.

FIG. 9 shows the configuration of a graphic processor adapted to module a texture using two kinds of color change information.

The graphic processor in FIG. 9 has a same configuration as shown in FIG. 7, except that it has two color information interpolation circuits.

As shown, the graphic processor comprises a texture mapping circuit 21 which uses an input texture information (Rt, Gt, Bt, At) and coordinates of three vertexes of a triangle to effect a texture mapping. It also comprises a first color information interpolation circuit 22a which uses a first three-vertex color information (Rg, Gg, Bg, Ag) obtained using the perfect scattered reflection model and the above three vertex coordinates, to effect an interpolative calculation of color information. An output from the texture mapping circuit 21 and a one from the first color information interpolation circuit 22a are multiplied together in a multiplication circuit 23a of a modulation circuit 23.

Also the graphic processor comprises a second color information interpolation circuit 22b which uses a second three-vertex color information (Rh, Gh, Bh, Ah) being three vertex coordinate color information obtained using the perfect scattered reflection model and the above three vertex coordinates, to effect an interpolative calculation of color information. An output from the second color information interpolation circuit 22b is added to an output of multiplication from the multiplication circuit 23a in an addition circuit 23b of the modulation circuit 23 to provide an output image (Ro, Go, Bo, Ao).

In the graphic processor constructed as mentioned above, the interpolation circuit for interpolation of two kinds of color change information may be doubled and the bus band width be doubled to attain a same speed of information processing as in the prior art.

Modulation of a texture using two kinds of color change information permits to attain a three-dimensional vision of an object which is approximate to a real shading but will need a larger-scale hardware including the graphic processor and an increased time for the processing.

SUMMARY OF THE INVENTION

Accordingly, it is an object of the present invention to overcome the above-mentioned drawbacks of the prior art by providing an image generating method and apparatus capable of processing image information using two kinds of color change information to generate an image having a nearly same visual effect as in the prior art without any increased scale of hardware and decreased speed of processing.

The above object can be accomplished by providing, according to the present invention, an image generating method for generating an image for display on an image display unit by pasting a texture image to each of polygonal triangular areas being component units of an image, wherein the texture information is modulated with a color change information as well as with a brightness change information.

The above object can also be accomplished by providing an image generating apparatus for generating an image for display on an image display unit by pasting a texture image to each of polygonal triangular areas being component units of an image, provided with means for effecting a texture mapping using the texture image and vertex coordinates of a polygonal area, means for interpolating color information with the vertex coordinates of the polygonal area and vertex color information, and a modulating means comprising means for multiplying the texture-mapped information and an image for which the color information is interpolated and a first means for adding a brightness information component incidental to a result of the above multiplication to the vertex color information.

The present invention provides an image generating method and apparatus capable of processing image information using two kinds of color change information to generate an image having a nearly same visual effect as in the prior art without any increased scale of hardware and decreased speed of processing.

BRIEF DESCRIPTION OF THE DRAWINGS

These objects and other objects, features and advantages of the present intention will become more apparent from the following detailed description of the present invention when taken in conjunction with the accompanying drawings, of which.

DETAILED DESCRIPTION OF THE PREFERRED EMBODIMENTS

In the image generating means according to the present invention, a calculation for shading an object using a combination of the perfect scattered reflection model and specular reflection model is done using a following set of expressions:

$$R=Rt*Lr*(Lx*Nx+Ly*Ny+Lz*Nz)+H*(\cos \theta)^n$$
$$G=Gt*Lg*(Lx*Nx+Ly*Ny+Lz*Nz)+H*(\cos \theta)^n \quad (4)$$
$$B=Bt*Lb*(Lx*Nx+Ly*Ny+Lz*Nz)+H*(\cos \theta)^n$$

The above set of expressions (4) is applicable for white reflected rays of light resulting from the specular reflection model, given by the second term in each of the set of expressions (3) above. Since some of the reflected rays of light resulting from the specular reflection model are strongly reflected rays, their pixels are saturated to incur a so-called "whitening" in so many cases that the reflected rays may be assumed to be a white light, which will not cause any practical problem. The value H in the set of expressions (4) can be obtained, for example, by taking it as a maximum one among Hr, Hg and Hb.

The image generating method according to the present invention utilizes the above fact to shade an object with a reduced amount of information. Thus, the hardware configuration can be simplified correspondingly.

Figure 1:
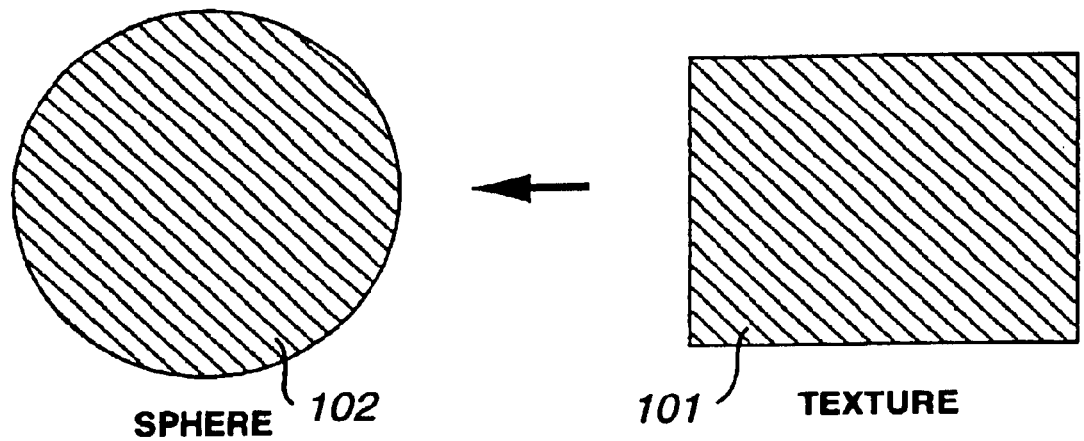
FIG. 1 is an explanatory drawing of a texture mapping.
Figure 2:
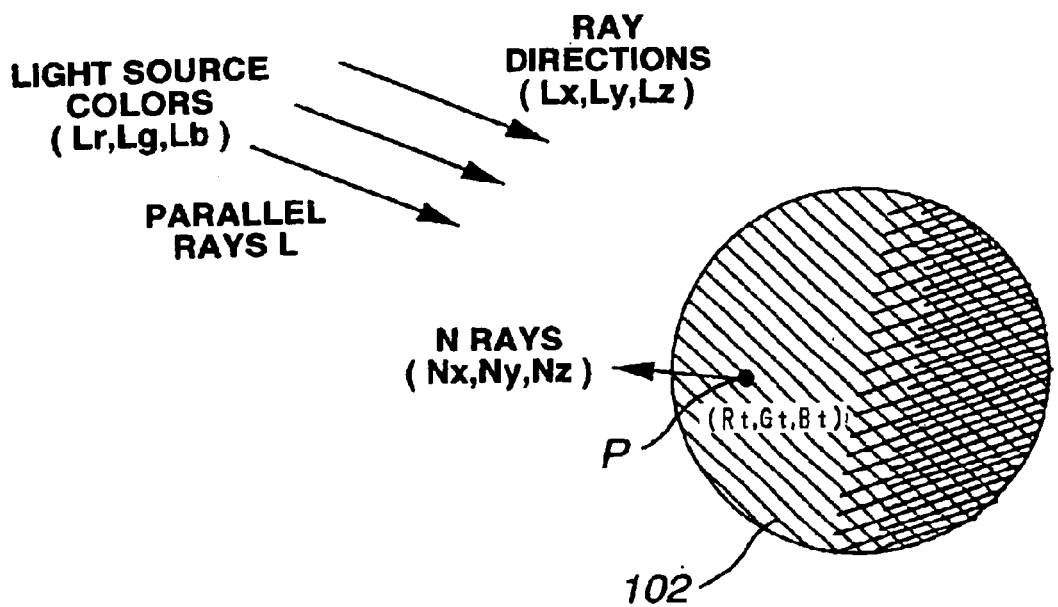
FIG. 2 is an explanatory drawing of a perfect scattered reflection model.
Figure 3:
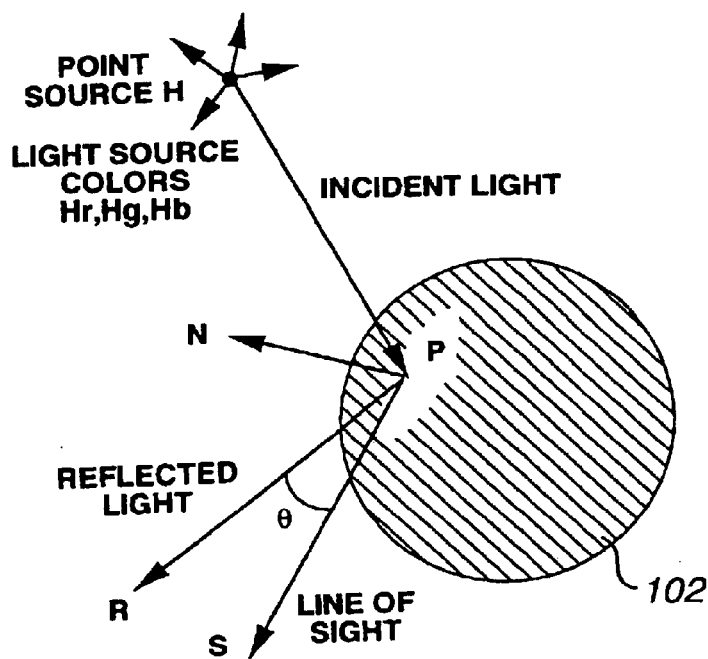
FIG. 3 is an explanatory drawing of a specular reflection model.
Figure 4:
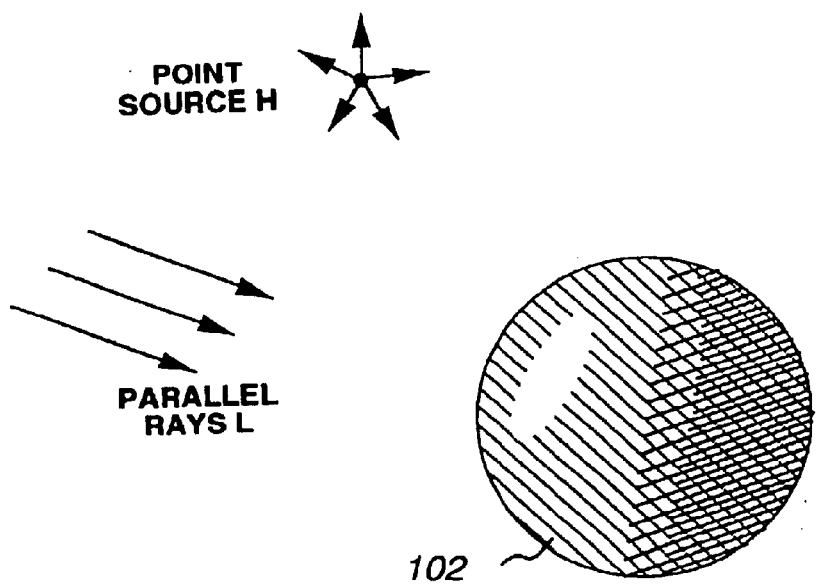
FIG. 4 shows a shading of an object by a combination of the perfect scattered reflection model and specular reflection model.
Figure 5:
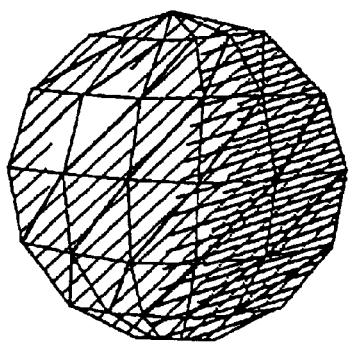
FIG. 5 shows a division of the surface of an object into triangular regions.
Figure 6:
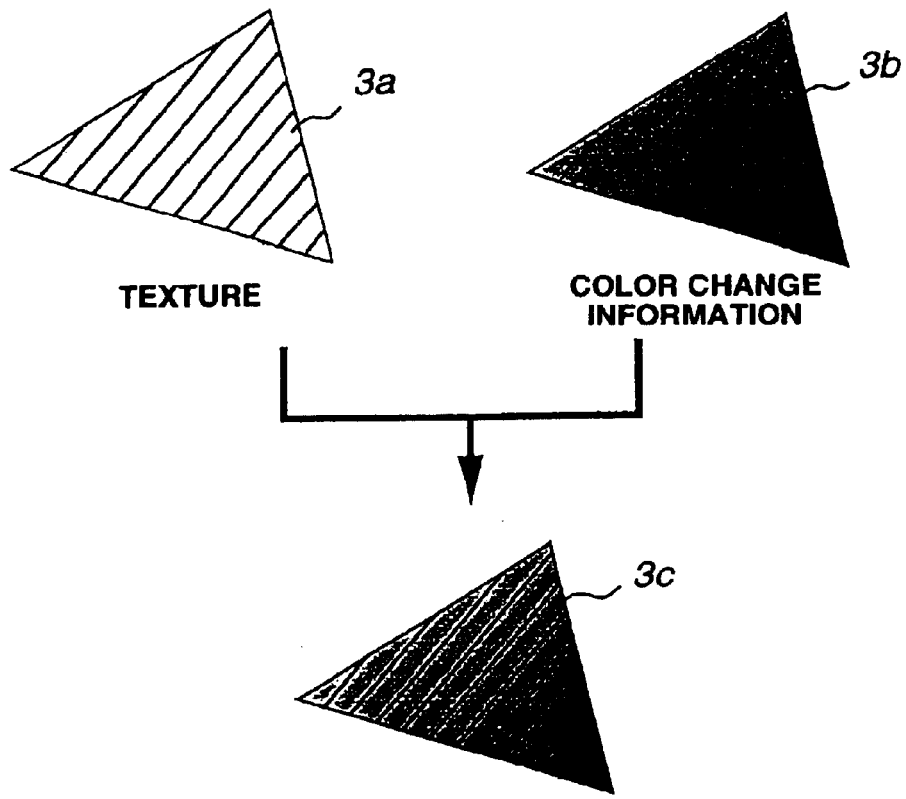
FIG. 6 shows a glow shading to calculate colors of all pixels included in a triangle.
Figure 7:
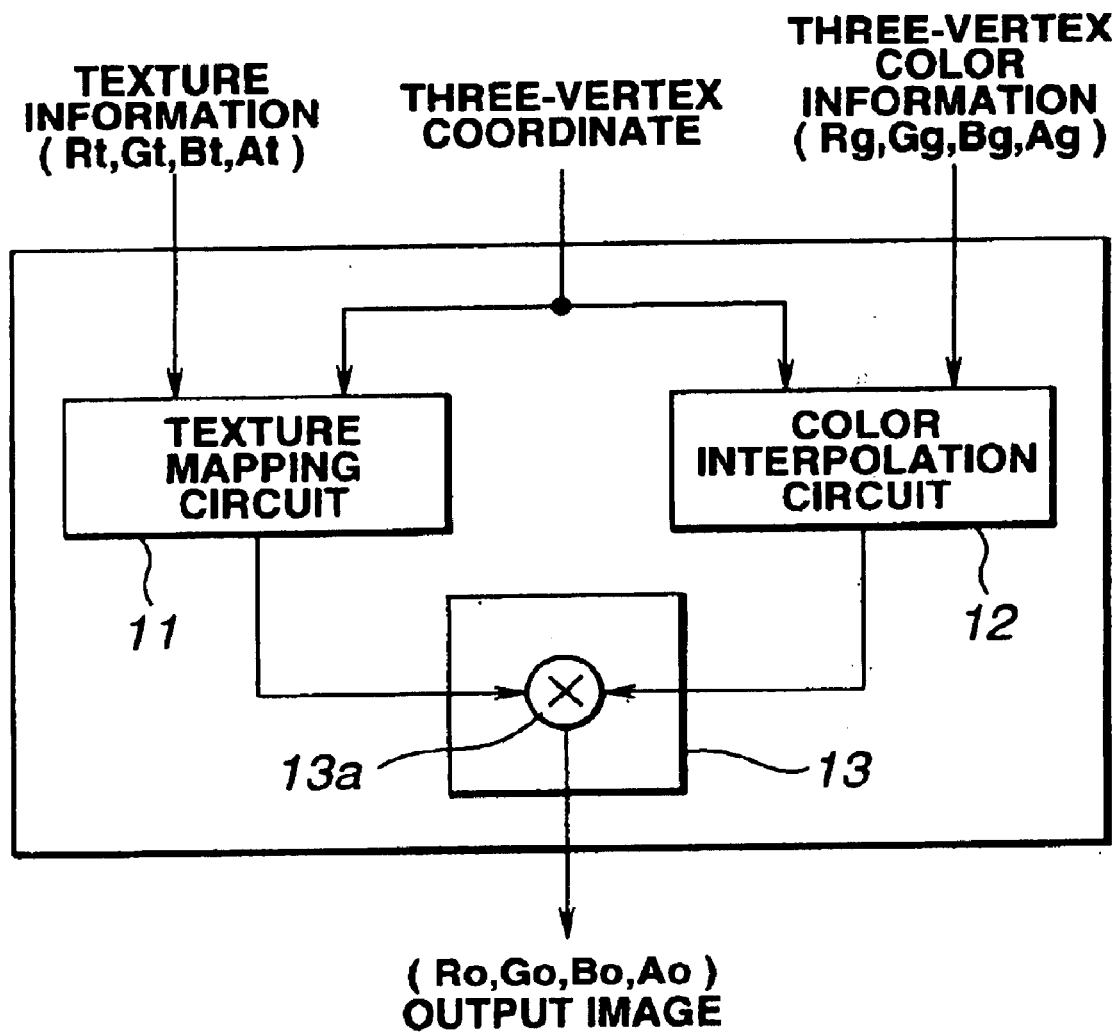
FIG. 7 shows the configuration of a conventional graphic processor.
Figure 8:
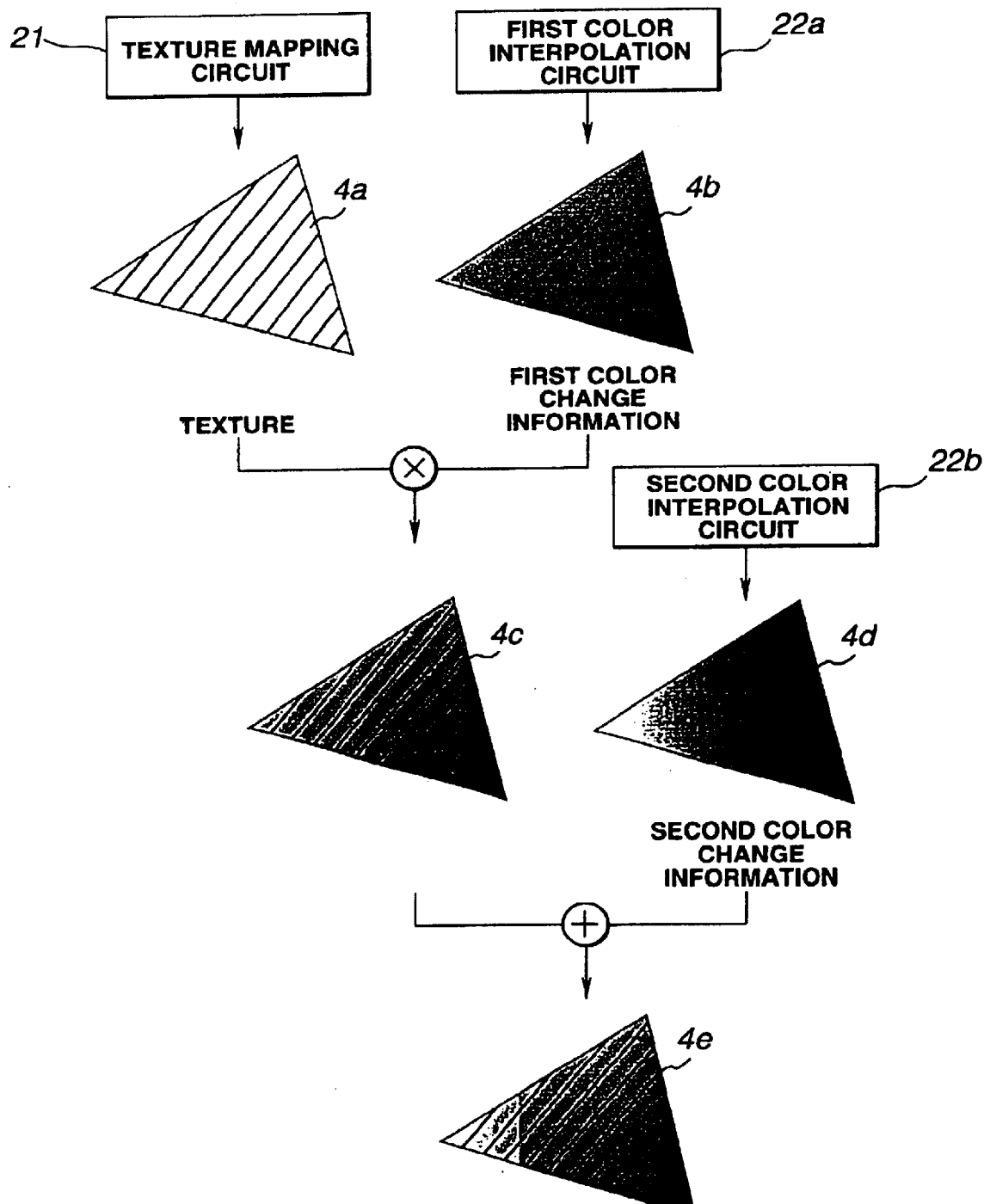
FIG. 8 shows a modulation of a texture using two kinds of color change information.
Figure 9:
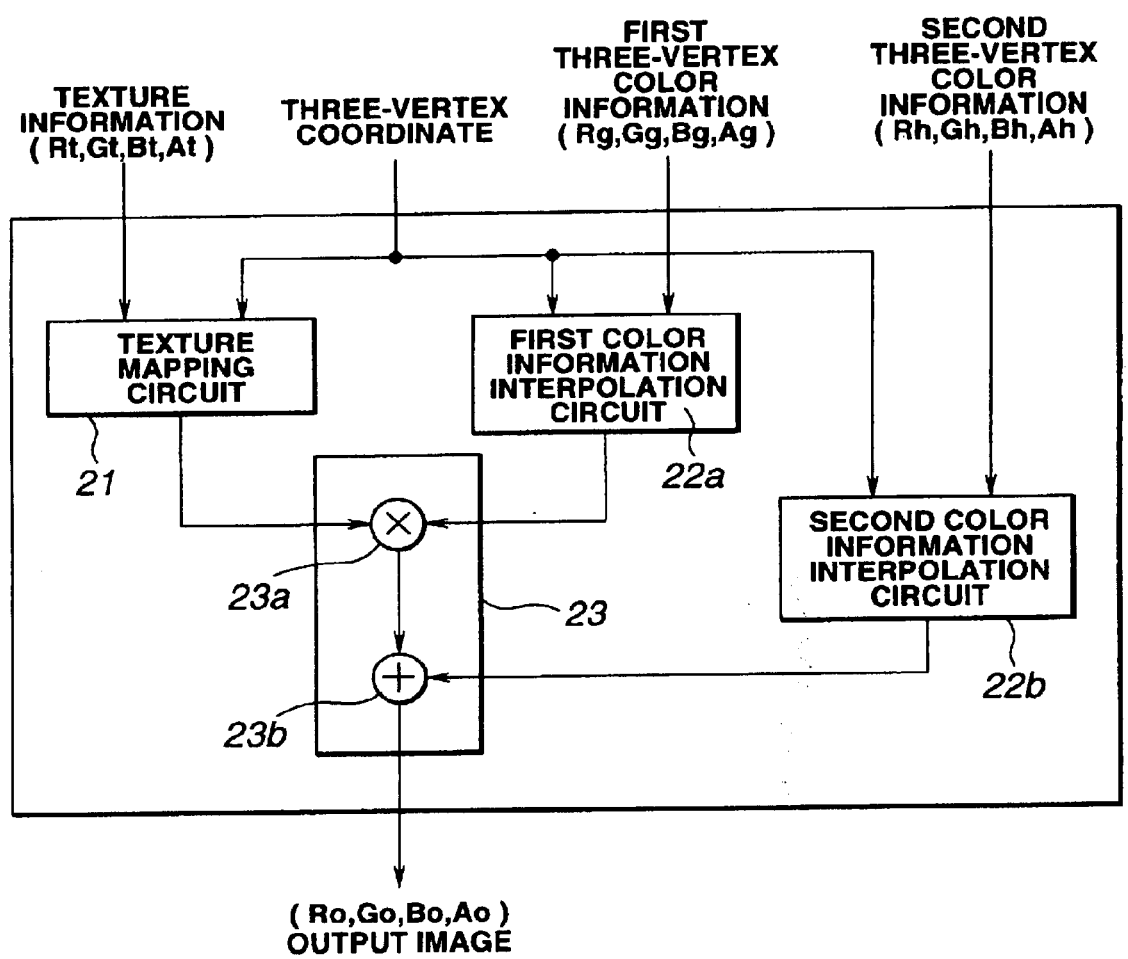
FIG. 9 shows the configuration of a conventional graphic processor adapted to module a texture using the two kinds of color change information.
Figure 10:
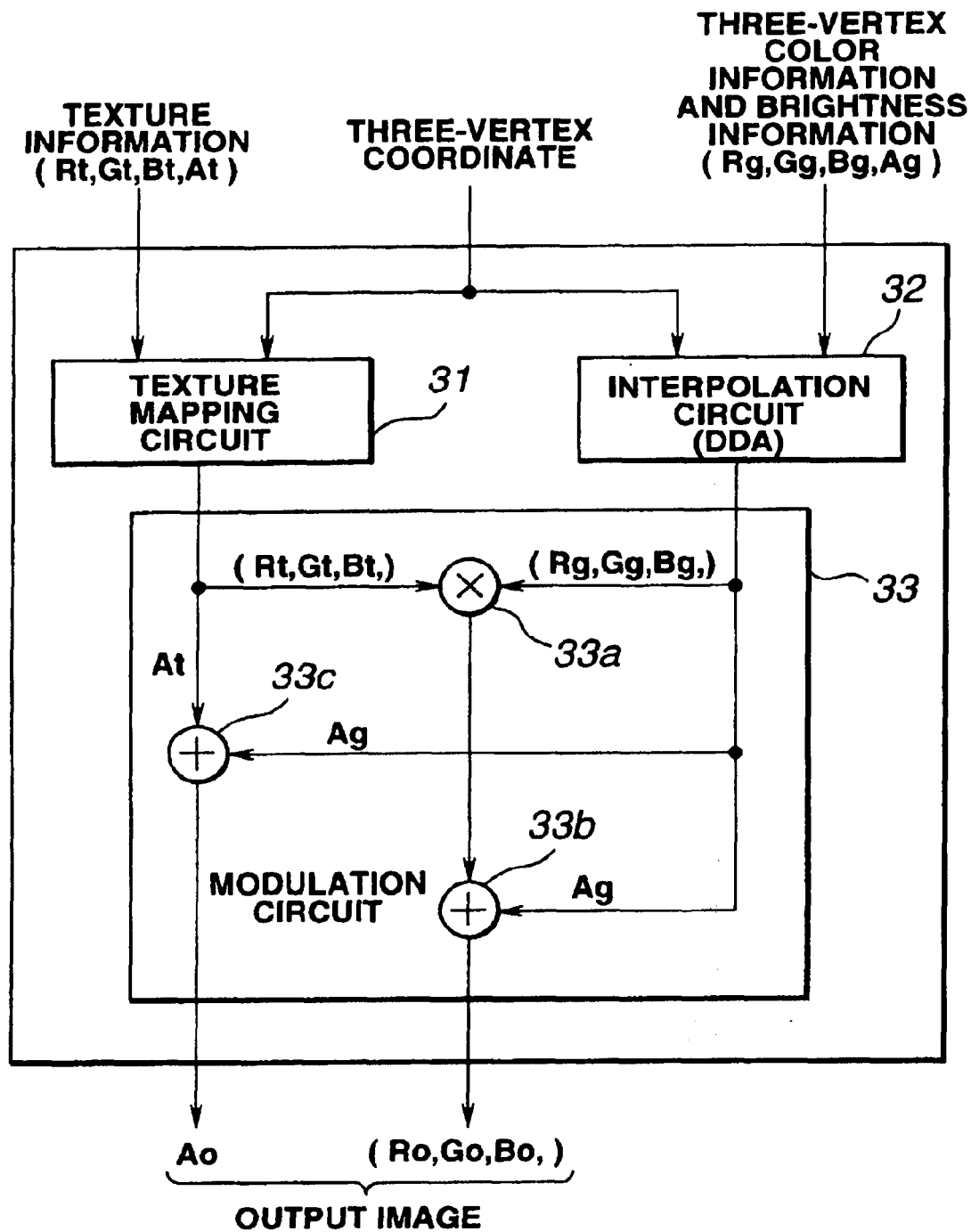
FIG. 10 is an example of configuration of a graphic processor used in an embodiment of the image generating apparatus according to the present invention.

FIG. 10 shows an example of the configuration of a graphic processor as one of the embodiments of the image generating apparatus according to the present invention.

The graphic processor is adapted to effect a calculation for shading an object using the set of expressions (4). It is suitably usable in a home-use entertainment device which requires a relative high accuracy and high speed of three-dimensional display of an image.

The graphic processor comprises a texture mapping circuit 31 which uses an input texture information and three vertex information of a triangle for texture mapping. It should be noted that the texture information (Rt, Gt, Bt, At) are supplied from a video memory (VRAM) incorporated in a system in which the graphic processor is used. Also, note that the three vertex information of a triangle are supplied from a CPU incorporated in a system in which the graphic processor is used.

The graphic processor further comprises an interpolation circuit (DDA) 32 which uses three vertex color information (Rg, Gg, Bg) of a triangle acquired using the perfect scattered reflection model and three vertex brightness information (Ag) of the triangle acquired using the specular reflection model to interpolate color information and brightness information. The three vertex color information and brightness information (Rg, Gg, Bg, Ag) are also supplied from a CPU in a system in which the graphic processor is used.

The graphic processor further comprises a modulation circuit 33 which uses an input texture information to modulate the vertex color information of the triangle. Color components Rt, Gt and Bt supplied from the texture mapping circuit 31 and color components Rg, Gg and Bg supplied from the interpolation circuit 32 are multiplied together in a multiplication circuit 33a of this modulation circuit 33.

A brightness component (Ag) supplied from the interpolation circuit 32 is added to an output from the multiplication circuit 33a in a first addition circuit 33b of the modulation circuit 33 to generate color components (Ro, Go, Bo) for an output image. The brightness component (Ag) is equivalent to a brightness component $H*(\cos \theta)n$ of reflected rays of light from an object surface, generated using the specular reflection model.

This graphic processor also comprises a second addition circuit 33c in which, when an input texture information includes a brightness component (alpha channel), a brightness component (Ag) of three vertex color information supplied from the color information interpolation circuit 32 is added to the brightness component (At) of the texture information supplied from the texture mapping circuit 31 to generate a brightness component (Ao) for an output image.

Owing to the above-mentioned configuration of the graphic processor, the addition of the adder to the modulation circuit of the conventional configuration permits to shade an object through combination of the perfect scattered reflection model and specular reflection model.

More particularly, for shading an object using the two reflection modes, the conventional graphic processor needs, as two kinds of color change information, information (Rg, Gg, Bg) (Rh, Gh, Bh) for six channels but the graphic processing according to the present invention needs only the information (Rg, Gg, Bg, Ag) for four channels. Therefore, the graphic processor according to the present invention needs no additional color information interpolation circuits to the conventional four circuits, so that the hardware of the image generating apparatus can be designed compact.

Figure 11:
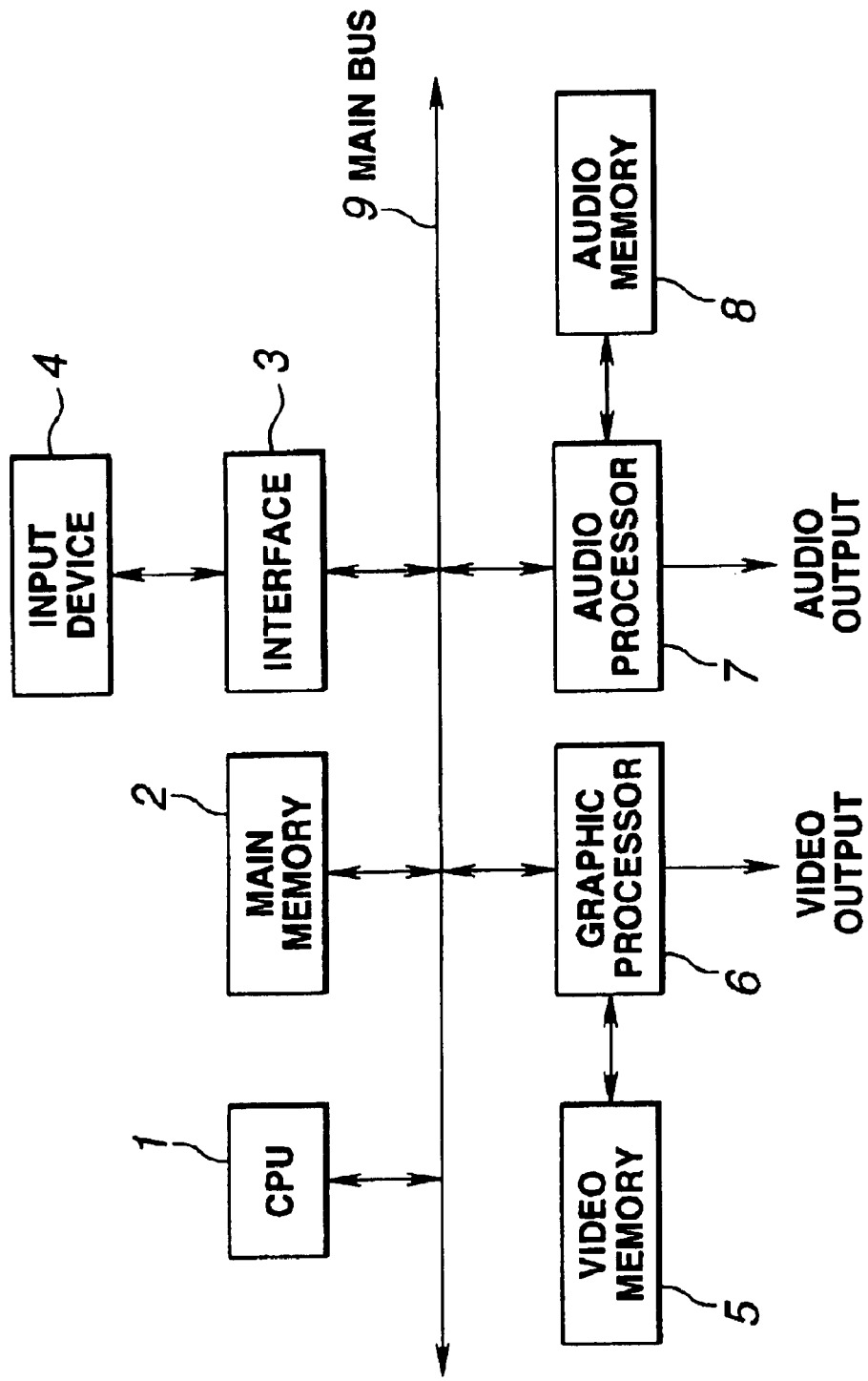
FIG. 11 is an example of configuration of an image generating system to which the image generating method and apparatus of the present invention are applied.

FIG. 11 shows an example of the configuration of an image generating system in which the aforementioned image generating method and apparatus according to the present invention are employed. The image generating system is used in a home-use entertainment device.

As shown in FIG. 11, the system incorporates a CPU 1 provided to calculate vertex coordinates for a triangle (polygon) of a to-be-generated image destined for display on a display unit, and calculate, from an attribute of an object and light source data, an inner product of a normal vector and light-source vector. Three vertex coordinates of the triangle and three vertex color information (Rg, Gg, Bg, Ag) are delivered from the CPU 1 to a graphic processor 6 which will be discussed later.

Also, the CPU 1 takes out control information for an input device 4 such as input pad, joystick, etc. through an interface 3 and main bus 9. The CPU 1 will send, based on the control information thus taken out, a three-dimensional image information stored in a main memory 2 being a first memory through the main bus 9 to the graphic processor 6.

The graphic processor (GPU) 6 transforms the input three-dimensional image information to generate an image data. The GPU 6 is constructed from the aforementioned image generating apparatus according to the present invention. A three-dimensional image based on the three-dimensional image data generated by the GPU 6 is depicted on a video memory 5 being a second memory.

The three-dimensional image depicted on the video memory 5 is read at each scan of video signal to display the three-dimensional image on a display unit (not illustrated).

Also, the three-dimensional image is displayed while an audio information for the three-dimensional image displayed, included in the control information taken out by the CPU 1 is sent to an audio processor 7 which displays, based on the input audio information, an audio data stored in an audio memory 8.

The image generating method and apparatus according to the present invention, having been described in the foregoing, can shade an object using two kinds of color change information acquired using the perfect scattered reflection model and specular reflection model through a linear interpolation of the color change information using the alpha channel of the graphic processor and glow shading, without any increased scale of the hardware. Also, since the calculations using two different kinds of color change information are effected separately, the processing speed is not caused to be slower.

What is claimed is:

1. A method of generating image data using texture data and only one set of color information consisting of three color components and one brightness component, the image data for pasting to polygons forming an image, said method comprising:

modulating the texture data with only three color components to generate modulated texture data, the color components obtained using a perfect scattered reflection model; and modulating the modulated texture data with only one brightness component, which is a single parameter obtained using the specular reflection model.

2. The method of claim 1 wherein modulating texture data with color components comprises multiplying the texture data with the color components.

3. The method of claim 1 wherein modulating the modulated texture data with the brightness component comprises adding the brightness component to the modulated texture data.

4. The method of claim 1 further comprising modulating alpha channel data with the brightness component.

5. The method of claim 4 wherein modulating alpha channel data with the brightness component comprises adding the brightness component to the alpha channel data.

6. An apparatus for generating image data using texture data and only one set of color information consisting of three color components and one brightness component, the image data for pasting to polygons forming an image, said apparatus comprising:

a first modulator for modulating the texture data with only three color components to generate modulated texture data, the color components obtained using a perfect scattered reflection model; and a second modulator for modulating the modulated texture data with only one brightness component, which is a single parameter obtained using the specular reflection model.

7. The apparatus of claim 6 wherein the first modulator comprises a multiplier for multiplying the texture data with the color components.

8. The apparatus of claim 6 wherein the second modulator comprises an adder for adding the brightness component to the modulated texture data.

9. The apparatus of claim 6 further comprising a third modulator for modulating alpha channel data with the brightness component.

10. The apparatus of claim 9 wherein the third modulator comprises an adder for adding the brightness component to the alpha channel data.

11. An apparatus for generating image data for pasting to polygons forming an image, said apparatus comprising:

a texture mapping circuit providing as output texture data;

an interpolation circuit providing as output only one set of color information consisting of three color components obtained using a perfect reflection model and one brightness component obtained using a specular reflection model;

a first modulator responsive to both the texture data and only three color components for providing as an output modulated texture data; and a second modulator responsive to the modulated texture data and only one brightness component for providing the image data.

* * * * *

UNITED STATES PATENT AND TRADEMARK OFFICE
CERTIFICATE OF CORRECTION

PATENT NO. : 6,774,896 B2
DATED : August 10, 2004
INVENTOR(S) : Masaaki Oka

It is certified that error appears in the above-identified patent and that said Letters Patent is hereby corrected as shown below:

Title page, Item [54] and Column 1, line 1,
Title, delete "METHOD AND APPARATUS FOR GENERATING IMAGE DATA BY MODULATING TEXTURE DATA WITH COLOR DATA AND BRIGHTNESS DATA" and insert -- IMAGE GENERATING METHOD AND APPARATUS --.

Signed and Sealed this

Twenty-fifth Day of January, 2005

JON W. DUDAS
*Director of the United States Patent and Trademark Office*